Figure 1:
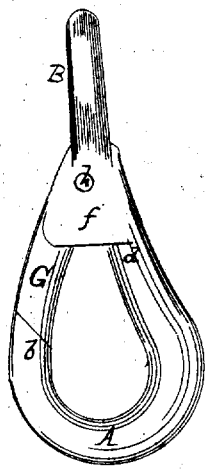

The Middletown Tool Company
Assees of
J R Henshaw
Self Mousing Hook
2867

Reissued
Feb 11 1868

Witnesses.
W. L. Beemen.
J. Rathbone, Jr

Inventor.
J. R. Henshaw
by his attorney
E. S. Renwick

United States Patent Office.

THE MIDDLETOWN TOOL COMPANY, OF MIDDLETOWN, CONNECTICUT, ASSIGNEES BY MESNE ASSIGNMENTS OF J. R. HENSHAW.

*Letters Patent No.* 21,879, *dated October* 26, 1858; *reissue No.* 2,166, *dated February* 6, 1866; *reissue No.* 2,867, *dated February* 11, 1868.

IMPROVEMENT IN SELF-MOUSING HOOKS.

The Schedule referred to in these Letters Patent and making part of the same.

TO ALL WHOM IT MAY CONCERN:

Be it known that I, JOHN R. HENSHAW, of Middletown, in the county of Middlesex, and State of Connecticut, have invented a new and useful Improvement in what I term Self-Mousing Hooks; and that the following is a full, clear, and exact description and specification of my said invention.

Self-mousing hooks, or snap-hooks, as such implements are commonly called, consist essentially of a hook proper to engage with the article to be secured, a spring-bar hinged to said hook and controlled by a spring, so as to close the opening or throat of said hook, and an eye or loop, (secured to the shank of the hook,) to which the rope, strap, or chain is applied, by which the implement is held.

Previous to my invention there were two classes of such hooks in use. In one of these classes, the spring for holding the spring-bar in place was arranged between the hinge pivot and the hook proper. In the other class the spring was arranged between the hinge pivot and the eye. The former class was defective because the spring was exposed to injury from the contact of articles held in the hook, while the latter class (which, so far as I know, were used only by goldsmiths, and were very small,) were also defective because the eye had to be set at a considerable distance from the hinge-pivot to give room for the insertion of the spring between the two; hence the implement was much longer in proportion than snap-hooks of the first class, besides being more costly to make.

The object of my invention is to protect from injury the spring of snap-hooks of the first class, without materially increasing the length of the implement, so that my improved snap-hook has the good qualities of both the classes above described without the defects of either.

To this end my invention consists of the combination of the hook proper, the spring-bar, and the eye, with a spring arranged to operate upon the spring-bar at a point intermediate between the pivot and the hook proper, and with ears or cheeks extending over said spring to protect it from injury. In this combination, the arrangement of the spring to operate at what may be termed the hook-side of the hinge-pivot, (instead of at the eye side thereof,) enables the article to be made of no materially greater length than the common snap-hooks heretofore in use with exposed springs, while the ears or cheeks form the side walls of a cavity or socket, in which the spring is contained, and by whose walls it is protected from injury.

In order that my invention may be fully understood, I will proceed to describe a snap-hook embodying it, and will refer to the accompanying drawing thereof, and to the letters and figures marked thereon—

Figure 2:
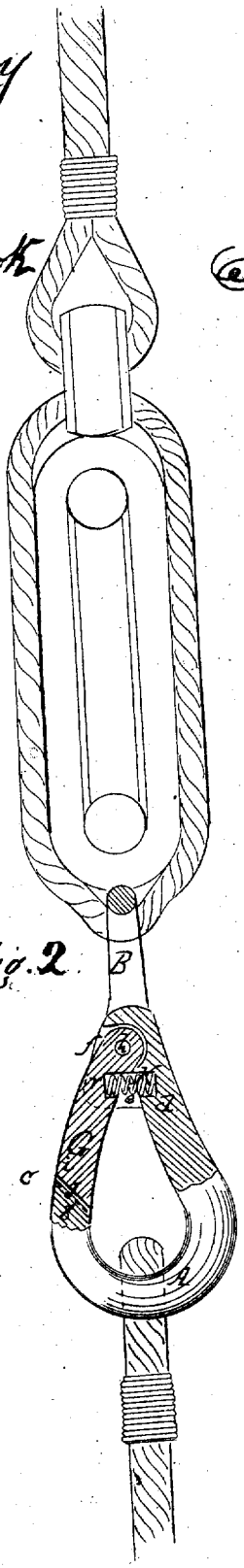

Figure 1 representing a side view of the improved snap-hook,

Figure 2 a partial section thereof, and

Figure 3:
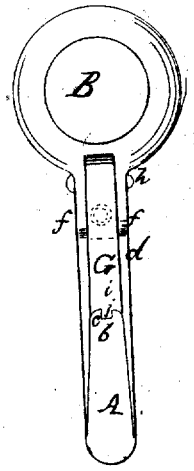

Figure 3 an edge view of the said snap-hook.

In said figures, A represents the hook proper, constructed of metal, with the eye B formed at one end as usual. The front or end, *b*, of the hook A is bevelled off or oblique, forming an angle of about forty-five degrees with the central line of the hook, and has also a groove, *c*, formed in its oblique face. At the end of the shank *d* of the hook adjoining the eye B, a socket, *e*, is formed by means of two ears or cheeks, *f f*, one at each side of the shank *d*; and within this socket one end of the spring-bar G is pivoted by means of the hinge pivot *h*. The end *i* of the spring-bar furthest from the pivot is bevelled to fit the bevelled end *b* of the hook proper, A, and has also a ledge or tongue, *j*, formed on it to fit the groove *c* of the end, *b*, of the said hook. Within the socket *e* formed by the ears or cheeks *f f*, a spiral spring, K, is arranged. This spring is constructed of brass wire; at least that would be the most preferable material in my opinion. One end of this spring bears against the spring-bar G of the hook A, at a point, *r*, intermediate between the hinge pivot *h* and the hook proper, A, while the other end of the spring bears against the shank *d* of the hook proper, A. A convenient mode of keeping the spring in place is represented in the drawing, small recesses being formed in the faces of the hook-shank and spring-bar to hold the ends of the spring. The spring K has a tendency to keep the end *i* of the spring-bar against the end, *b*, of the hook proper, A, and as said ends are bevelled, the spring-bar cannot be forced outward beyond the end, *b*. The tongue or projection *j* of the spring-bar engaging the groove *c*, prevents any lateral play of the bar G. The spring-bar thus closes the throat of the hook, and is a substitute for the spun-yarn that is frequently used in hooks for marine purposes, such spun-yarn being technically termed a "mousing." As the spring-bar is pressed against the point of the hook by the yielding pressure of the spring, the hook may be readily engaged with a ring, or loop, or eye, by pressing the bar directly against said article.

As the spring in my improved snap-hook is arranged as to operate on the spring-bar between the hinge-pivot and the hook proper, the necessity of extending the spring-bar on the eye side of the hinge pivot is obviated, and the eye may be set close to the said hinge pivot, while by extending the ears *f f* on each side of the spring, the latter, although extending into the triangular space between the spring-bar and the hook proper, is protected from being injured by an article therein, because the edges or lips of these ears or cheeks prevent such article from bearing against the spring so as to injure it. Thimbles or links of chain with which snap-hooks are engaged, have a tendency to play or move about in the space within the hook, and injure any exposed spring, but in my combination and arrangement the lips of the ears will receive the blow of the article in the hook, and will prevent injury to the spring.

Having thus described a snap-hook embodying my improvement, I declare that I do not claim the members of the snap-hook described by me, irrespective of the arrangement of the spring relatively to the ears and hinge pivot; but

What I claim as my invention, and desire to secure by Letters Patent, is—

The combination and arrangement of the hook proper, eye, spring-bar, spring, and cheeks to protect the spring, substantially as before set forth.

In testimony whereof, I have hereto set my hand, this day of September, A. D. 1867.

JOHN R. HENSHAW.

Witnesses:

M. B. COPELAND,

ARTHUR W. BACON.